United States Patent

Wienand et al.

[11] 3,914,147

[45] Oct. 21, 1975

[54] APPARATUS AND METHOD FOR THE CONTINUOUS PRODUCTION OF WOUND PIPES

[75] Inventors: Michael Wienand; Klaus Jensen, both of Siegburg; Franz Primessing, Niederkassel-Mondorf; Franz-Werner Alfter, Siegburg, all of Germany

[73] Assignee: Dynamit Nobel Aktiengesellschaft, Germany

[22] Filed: May 4, 1973

[21] Appl. No.: 357,089

[30] Foreign Application Priority Data
May 4, 1972 Germany............................ 2221727

[52] U.S. Cl. ............... 156/195; 156/244; 156/353; 156/361; 156/429; 156/498; 156/500
[51] Int. Cl.² .................. B65H 81/00; B29C 19/00
[58] Field of Search ........... 156/191, 192, 193, 194, 156/195, 425, 428, 429, 244, 143, 353, 361, 498, 499, 500, 501, 311, 282; 138/140, 150, 154; 29/477 R, 477.3, 477.7; 93/80, 83

[56] References Cited
UNITED STATES PATENTS

| | | | |
|---|---|---|---|
| 2,354,120 | 7/1944 | Haren................................. | 156/361 |
| 2,737,091 | 3/1956 | Robinson............................ | 156/193 |
| 2,994,104 | 8/1961 | Mittag............................ | 156/244 X |
| 3,173,822 | 3/1965 | Rigaut................................ | 156/429 |
| 3,239,400 | 3/1966 | Anselm........................... | 156/143 X |
| 3,243,328 | 3/1966 | Britton et al..................... | 156/244 X |
| 3,263,321 | 8/1966 | Lombardi....................... | 138/154 X |
| 3,606,670 | 9/1971 | Wienand et al................... | 29/453 X |
| 3,673,032 | 6/1972 | Komolt............................ | 156/244 X |
| 3,740,294 | 6/1973 | Wienand et al..................... | 156/429 |

FOREIGN PATENTS OR APPLICATIONS
629,008   10/1961   Canada............................... 156/425

*Primary Examiner*—Charles E. Van Horn
*Assistant Examiner*—David A. Simmons
*Attorney, Agent, or Firm*—Craig & Antonelli

[57] ABSTRACT

An apparatus and method for the continuous production of wound pipes from an extruded profiled strip. In order to compensate for deviations in the speed of the strip being supplied by an extruder, a control mechanism for controlling the speed of the wind-up drum in dependence on the magnitude of the sag in the profiled strip at a position intermediate the extruder and wind-up drum is provided. To further accommodate any deviations in a cross-sectional size of the profiled strip, a cooled sizing shoe is provided for shaping the outer contours of the pipe formed by the connected-together, spirally wound extruded strips. In order to cut the completed pipe in a single plane perpendicular to the axis of the pipe, without circumferentially moving the cutting apparatus, and while maintaining the winding mandrel continuously rotating, a cutting mechanism control means is provided which axially moves the cutting mechanism at the same speed as the axial movement of the completed pipe along the mandrel.

17 Claims, 6 Drawing Figures

FIG. 1
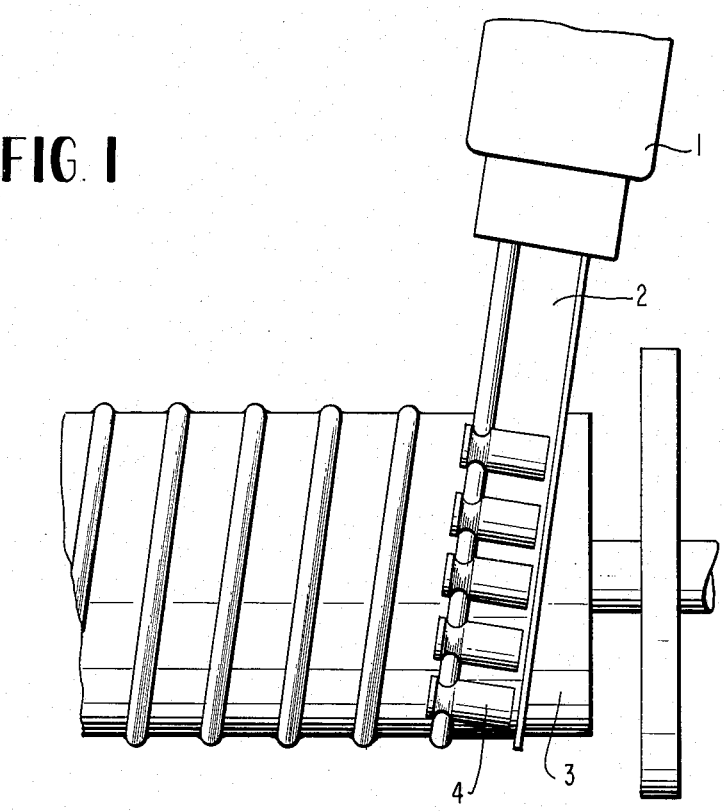
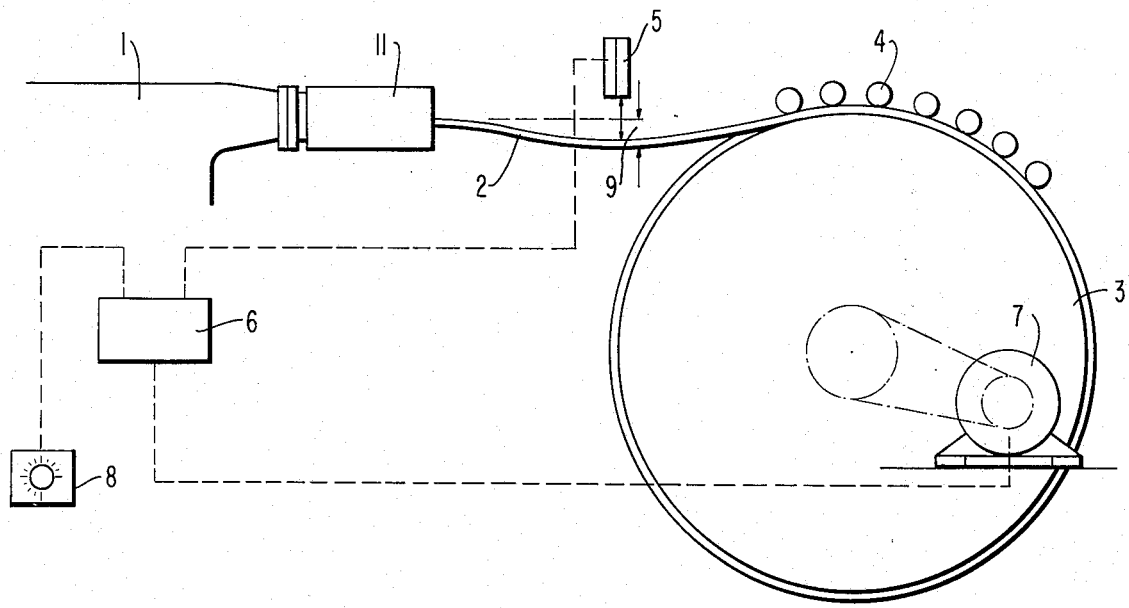
FIG. 2

APPARATUS AND METHOD FOR THE CONTINUOUS PRODUCTION OF WOUND PIPES

BACKGROUND AND SUMMARY OF THE INVENTION

The present invention relates to an apparatus and method for the continuous manufacture of wound pipes from an extruded profiled strip. More specifically, the present invention relates to means for the compensation of deviations in an extruded profiled strip supplied for the continuous manufacture of the wound pipes. The type of pipes contemplated by the present invention are formed preferably of thermoplastic synthetic resinous strips continuously produced by an extruder with one edge of the strips having a tongue and the other edge of the strips having a groove for receiving the tongue so that they can be joined together. These strips are spirally wound onto a rotatable wind-up drum where peripherally arranged pressure rollers guide the strips in a spiral manner and assist in thermoplastically joining successive windings to one another to form the pipe. A cooling unit is disposed and a pipe take-off device consisting of several adjustable take-off rollers distributed along the circumference of the pipe and being arranged mutually offset in correspondence with the pitch of the profile in the direction of the pipe axis are provided for cooling and removing the pipe from the drum.

It has been contemplated to produce plastic pipes by the spiral wind-up profiled strips of a thermoplastic synthetic resin, wherein one edge of the profiled strip has a tongue and the other edge has a bead with a groove for receiving the tongue. This winding strip is wound up, in the softened condition, spirally onto a rotating drum serving as the mandrel so that the tongue of a preceding winding is continuously received in the groove of the bead of the directly following winding, and the finished pipe, formed after welding and/or hardening of the junction points, is continuously withdrawn from the drum.

In order to conduct this just described method, an apparatus has been contemplated comprising, in addition to an extruder for the extrusion of the winding profiled strip, a wind-up device with a rotating drum having a cylindrical section and a slightly conical section and with a pressure element consisting of several pressure rollers disposed radially at equal spacings with respect to the outer surface of the cylindrical drum section, and further comprising a take-off device for supporting the rotary motion of the pipe and the discharge of the pipe in the axial direction.

The present invention contemplates improvements in the above-described apparatus for the continuous manufacture of wound pipes in order to obtain high-quality, uniform, and dimensionally accurate pipes. Since, in particular, the extruder discharges the profiled strip with certain variations in extrusion speed as well as in the shape of the profile, which can be caused by differences in the material and in the temperature, these variations must be fully compensated for by the winding device during the production of the profiled strip.

According to this invention, it is suggested, therefore, in an apparatus of the above-described type, to provide a control device for regulating the rotary speed of the winding drum in dependence on the extrusion speed of the profiled strip. By the accurate synchronization of the extrusion speed of the profiled strip with the peripheral speed of the wind-up drum in accordance with the present invention, it is possible to produce substantially flawless pipes. The fluctuations in the extrusion speed occurring during the production of the profiled strip are fully absorbed or accounted for by changes in speed of the wind-up drum. A device constructed according to a preferred embodiment of this invention provides that the profiled strip between the outlet of the extruder and the point of entrance onto the winding drum has a slight sag, the magnitude of which is constantly detected and fed to the control device. The scanning of this sag can be effected, for example, by means of a feeler pin, a roller, a light barrier, or similar, suitable appliances and can be transmitted to the control device which, in turn, controls the speed or number of revolutions of the drive motor of the winding drum. Logically, when the sag of the profiled strip becomes smaller, the speed of the winding drum is reduced and, when the sag becomes larger, this speed is increased.

In addition to the need for a uniform wind-up of the pipes, high requirements must also be met with regard to the dimensional accuracy of the pipes. This dimensional accuracy is dependent, in particular, also on the uniformity of the cross-section of the extruded profiled strip. However, a sizing operation can only be carried out after the profiled strip has been wound onto the winding drum, i.e., after the profiled strip has been welded together and has been curved in accordance with the radius of the drum. Therefore, a further development of the device of this invention provides to construct the cooling unit, disposed after the pressure rollers for obtaining the flawless welding and/or hardening joint of the profiled strips, on the one hand as a winding drum, the temperature of which can be controlled, and, on the other hand, as a coolable sizing shoe adapted to the shape and curvature of the profiled strip.

The length of the sizing shoe is provided in correspondence with the required sizing time; simultaneously, the shoe is arranged to be adjustably displaceable in the radial direction with respect to the axis of the drum, in order to set the respectively required size. Since it is not always necessary to size the profiled strip over its entire width, other preferred embodiments of the present invention contemplate providing the profile of the sizing shoe so that it covers only part of the cross-section of the profiled strip.

In order to crosscut the continuously manufactured wound pipes in a planar-parallel and right-angled manner without arresting the winding drum, a sawing device is provided according to the present invention which is moved, during the sawing step, synchronously with the axial take-off speed of the pipe in the take-off direction. In order to realize this requirement, the present invention contemplates a preferred embodiment where a lightweight metal basket is attached, for example, in the pipe at the pipe outlet in such a manner that several stays of this metal basket converge in the center of the pipe and form a scanning point for the take-off speed, which is detected by a scanning means and is employed for controlling the drive of the sawing device.

The above-mentioned and further objects, features and advantages of the present invention will become more obvious from the following description when taken in connection with the accompanying drawing which shows, for purposes of illustration only, several embodiments in accordance with the present invention.

BRIEF DESCRIPTION OF THE DRAWINGS

FIG. 1 is a top schematic plan view of a portion of apparatus for manufacturing wound pipes in accordance with a preferred embodiment of the present invention;

FIG. 2 is a schematic view of the apparatus of FIG. 1 which shows a scanning device for controlling the winding drum drive in accordance with the present invention;

DETAILED DESCRIPTION OF THE DRAWINGS

Figure 3:
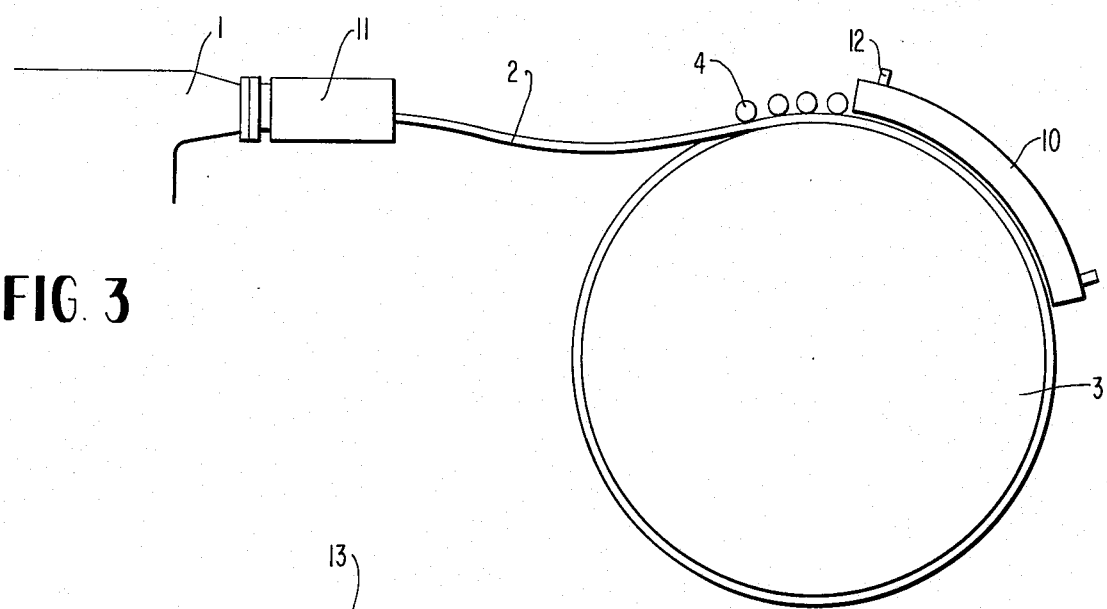
FIG. 3 is a schematic view of the apparatus of FIG. 1 which shows a sizing device in accordance with the present invention.

FIG. 1 shows schematically the wind-up procedure for a profiled strip 2 of thermoplastic synthetic resin continuously extruded from an extruder 1. After exiting from the extruder, the profiled strip 2 is fed onto the winding or wind-up drum 3 under the wind-up angle or profile pitch angle not indicated in detail with the tongue of the profiled strip extending in the longitudinal direction and the groove of the profiled strip 2 extending in the longitudinal direction serving as governing or guiding variables or parts. In this connection, the profiled strip 2 is arranged in such a manner that, as seen in the direction from the winding device 3 toward the extrusion tool 1, the bead with the groove is disposed on the left-hand side and the tongue is arranged on the right-hand side of the profile in the longitudinal extension thereof. After the profiled strip 2 has arrived at the winding drum 3, the profiled strip is entrained by the rotating winding drum by the pressure exerted by the pressure rollers 4 for pressing the strip against the drum surface, and the strip moves in the peripheral direction of the drum. Simultaneously, the profiled strip is pushed over the winding drum in accordance with the winding angle, in the axial direction, by the oblique positioning of the axes of the pressure rollers with respect to the drum axis, namely, by an amount corresponding after one revolution of the drum to the average distance between the groove and the tongue of the profiled strip. By this pushing motion in the axial direction of the drum, the tongue of the profiled strip 2, after one drum revolution, is disposed exactly underneath the groove of the profiled strip section entering the drum at that moment, which groove is disposed on the other side of the profiled strip 2. The tongue of the profiled strip section in contact with the drum and the groove of the entering profiled strip section interlock and are firmly welded together, for example, by blowing a stream of hot air thereon, which converts the parts into the thermoelastic condition, and by the pressure of the pressure rollers. The thus-welded section of the profiled strip 2 then travels further in the peripheral and axial directions over the drum 3. The movement of the wound pipe in the peripheral as well as axial directions of the drum 3 is supported by a take-off device, which likewise is equipped with take-off rollers, which is arranged after the drum 3. For a further detailed disclosure of the apparatus of the type contemplated by the present invention or joining successive windings, see commonly assigned U.S. Pat. No. 3,606,670 and for a further detailed disclosure of a take-off device that could be used with the present invention, see commonly assigned U.S. patent application Ser. No. 69,251, now U.S. Pat. No. 3,740,294. U.S. Pat. No. 3,679,631 is also incorporated herein by reference to assist in the understanding of the present invention.

FIG. 2 schematically illustrates a control device 6 which a scanning unit 5 for controlling the speed or number of revolutions of the drive 7 of the winding drum 3 in dependence on the exit speed of the profiled strip 2 from the profiling tool 11 of the extruder 1. Between the exit or discharge of the tool 11 and the point of entering or initially engaging the winding drum 3, the profiled strip 2 is allowed to sag slightly. This sag 9 is detected by means of a scanning device 5, for example, a feeler pin, a roller, or a light barrier, and is transmitted to the control device 6, which controls the speed of the drive motor 7 of the winding drum 3. Depending on the required conditions, the control device is programmed via the basic setting instrument 8. The signal from the device 5 can be an electrically triggered pulse and the control device 6 can include a pair of control relays for accelerating or braking the drive 7 in dependence on the pulse signal from device 5. The drive 7 can be an electric motor which drives the drum by a belt drive connection. Since known components for the scanning device 5, control device 6, and setting instrument 8 could be combined, by one skilled in the art given the present disclosure, to control the drive motor 7 as described above, further details of such components are not included herein in order not to obscure the present invention.

Figure 4:
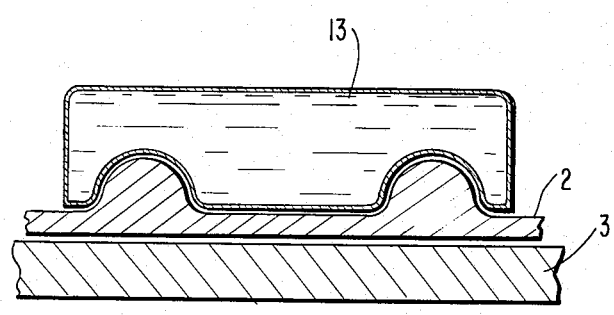
FIGS. 4 and 5 are enlarged schematic partial views showing preferred embodiments of sizing shoes constructed in accordance with the present invention.
Figure 5:
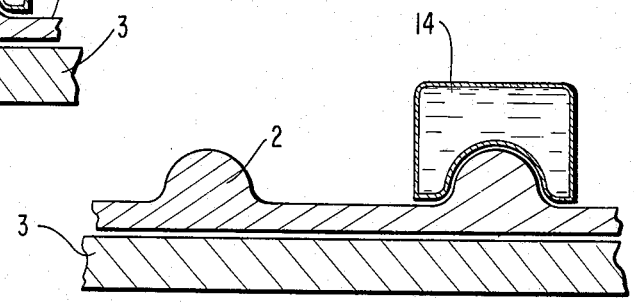

FIGS. 3 through 5, schematically illustrate a sizing mechanism for the wound pipe. The sizing operation takes place after the profiled strip 2 has entered the winding drum 3 and after the profiled strips 2 have been joined by welding. A previous sizing of the profiled strip would have a negative effect on the quality of the weld seam and would lead to stresses in the wound pipe. Consequently, the sizing in accordance with the present invention is conducted between the temperature-controllable winding drum 3 and a coolable sizing shoe 10 adapted to the shape and curvature of the profiled strips 2 forming the pipe. The cooling medium enters the sizing shoe 10 at point 12 and exits at the lower pipe or shoe 10. The length of the sizing shoe 10 is designed in correspondence with the required sizing time. The sizing shoe 10 is also disposed to be adjustably displaceable in the radial direction with respect to the drum axis by way of adjusting means not illustrated in detail. Since, in accordance with the respective requirements, it is not always necessary to size the profiled strip 2 over its entire width, the present invention not only contemplates a sizing shoe 13 as shown in FIG. 4 which covers the entire cross-section of the profiled strip, but also contemplates an alternative embodiment of a sizing shoe 14 as shown in FIG. 5 which extends only over the outermost bead of the profiled strip 2. The sizing shoe 10 is attached outside of the drum to the framework carrying the drum by way of a linkage which is not illustrated in detail. The sizing shoe is offset axially with respect to the pressure rollers 4 to such an extent as it is spaced from the rollers 4 in the direction of the pitch of the helically wound profiled strip.

Figure 6:
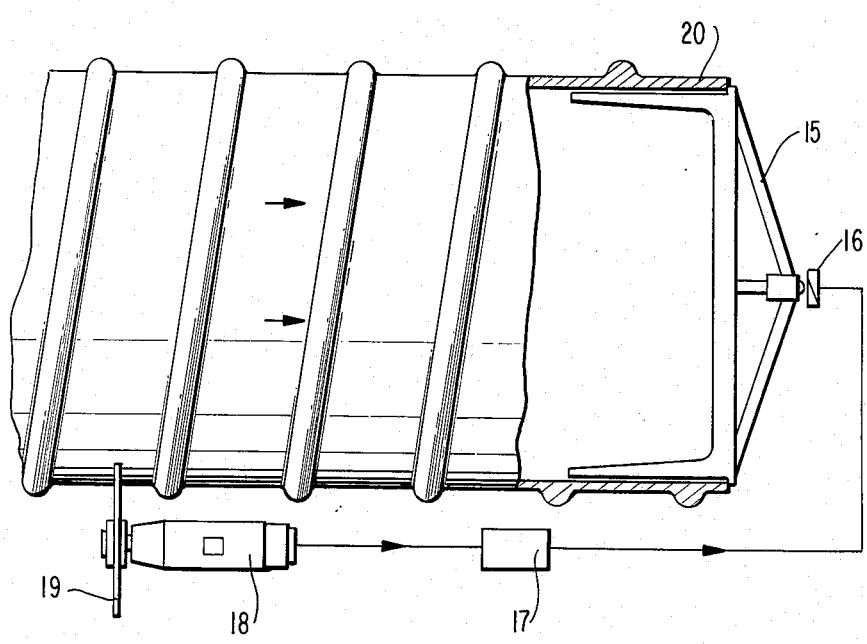
FIG. 6 is a schematic view of the apparatus of FIG. 1 which shows a scanning device for controlling a sawing unit in accordance with the present invention.

Since the wound pipe 20 (see FIG. 6) rotates, during the winding step, substantially constantly and uniformly about its longitudinal axis, it is necessary, in order to obtain a self-contained, planar-parallel and right-angled saw cut, to move a sawing or cutting device during the cutting step synchronously with the axial take-off speed of the pipe in the take-off direction, Such an arrangement is shown schematically in FIG. 6. A metal basket 15 is mounted at the pipe end 20, the stays of this basket coverging in the center of the pipe. This junction point of the stays moves with the axial take-off speed of the pipe, due to the fact that the metallic basket 15 is attached within the pipe. An externally disposed scanning device 16, which can, for example, be folded or swung away to accommodate removal of pipe section functions in a mechanical, electronic, or pneumatic manner to exactly detect the axial pipe take-off speed and transmit this speed either directly or with the aid of a servomotor 17 to a sawing mechanism 18, 19. By means of this arrangement, it is possible to cut the pipes by sawing in any desired length in a planar-parallel and right-angled direction.

The scanning device 16 can be constructed similar to the scanning device 5 with a pin, roller, or light barrier continuously scanning the position of scanning point of the metallic basket 15 and the device 16 supplying an electrical signal to servomotor 17, thus controlling the travelling speed of the sawing mechanism. The sawing mechanism can be movably mounted on a slide extending along the length of the drum. The scanning mechanism can include an electronic motor 18 for driving saw blade 19.

It is also contemplated by the present invention to employ apparatus, as improved by this invention, for increasing the manufacturing speed during the production of wound pipe, wherein several profiled strips are extruded simultaneously which strips enter the winding drum offset with respect to the width of the profiled strip and are welded together thereon.

We claim:

1. Apparatus for manufacturing wound pipes comprising:
   a rotatable winding drum;
   extruding means for continuously supplying a profiled strip to a winding surface of said drum, said profiled strip being formed of thermoplastic resinous material and including a tongue along one edge and a groove along an opposite edge;
   drum drive means for rotatably driving said drum;
   strip guide means for guiding said profiled strip onto said winding surface with successive windings of said strip extending in a spiral manner in close proximity to one another, the tongue of one winding being engageable in the groove of the next successive winding, said guide means including pressure rollers engageable with at least one of said groove and tongue of said profiled strip;
   joining means for joining said successive windings to one another to form a pipe from said profiled strip, said pressure rollers also serving as part of said joining means, and said joining means including means for thermoplastically joining said windings along said tongue and groove including means for heating said profiled strip in the area of said pressure rollers such that successive windings of said profiled strip are joined to one another in the area of said pressure rollers;
   drum drive control means for controlling the speed which said drum drive means rotatably drives said drum as a function of the extrusion speed of the profiled strip being supplied by said extrusion means; and
   cooling unit means arranged after said pressure rollers with respect to the path of said profiled strip for cooling the joined windings.

2. Apparatus according to claim 1, wherein said cooling unit means includes a coolable sizing shoe adapted to the shape and curvature of the profiled strip for controlling the dimensional accuracy of the pipe.

3. Apparatus according to claim 2, further comprising pipe take-off means for continuously removing the pipe from said drum at a position arranged after said cooling unit means with respect to the path of said profiled strip.

4. Apparatus according to claim 2, wherein said sizing shoe is adjustable in the radial direction with respect to the axis of rotation of the drum.

5. Apparatus according to claim 4, wherein the profile of said sizing shoe covers only part of the cross-section of the profiled strip, said part of the cross-section forming the outermost parts of the pipe in the completed condition.

6. Apparatus according to claim 2, wherein said drum drive control means includes means for detecting the magnitude of the sag in said profiled strip occurring between said extruding means and said drum, and means for controlling the speed of the drum drive means as a function of the magnitude of said sag.

7. Apparatus according to claim 4, wherein said drum drive control means includes means for detecting the magnitude of the sag in said profiled strip occurring between said extruding means and said drum, and means for controlling the speed of the drum drive means as a function of the magnitude of said sag.

8. Apparatus according to claim 3, wherein said pipe take-off means removes said pipe from said drum at an axial pipe take-off speed proportional to the speed of the winding drum, wherein a sawing mechanism is provided adjacent said drum for cutting the completed pipe into sections, and wherein sawing mechanism control means are provided for moving the sawing mechanism synchronically with the axial movement of the pipe so as to effect a planar cutting of the pipe at right angles to the axis of rotation of the drum with a circumferentially relatively fixed sawing mechanism.

9. Apparatus according to claim 8, wherein said sawing mechanism control means includes means for detecting the axial pipe take-off speed and means for controlling the axial movement of the sawing mechanism as a function of said axial pipe take-off speed.

10. Apparatus according to claim 9, wherein a metal basket with radially extending stays is attached in the end of the pipe, several of said stays converging at a central position with respect to said pipe to form a scanning point for a scanning unit of said sawing mechanism control means, said scanning unit forming said means for detecting the axial pipe take-off speed.

11. Apparatus for manufacturing wound pipes comprising:
   a rotatable winding drum;
   extruding means for continuously supplying a profiled strip to a winding surface of said drum;
   drum drive means for rotatably driving said drum;

strip guide means for guiding said profiled strip onto said winding surface with successive windings of said strip extending in a spiral manner in close proximity to one another;

joining means for joining said successive windings to one another to form a pipe from said profiled strip;

drum drive control means for controlling the speed which said drum drive means rotatably drives said drum as a function of the extrusion speed of the profiled strip being supplied by said extrusion means;

pipe take-off means for continuously removing the pipe from said drum at a position arranged after said joining means with respect to the path of said profiled strip, said pipe take-off means removing said pipe from said drum at an axial pipe take-off speed proportional to the speed of the winding drum;

a sawing mechanism provided adjacent said drum for cutting the completed pipe into sections; and sawing mechanism control means provided for moving the sawing mechanism synchronically with the axial movement of the pipe so as to effect a planar cutting of the pipe at right angles to the axis of rotation of the drum with a circumferentially relatively fixed sawing mechanism, wherein said sawing mechanism control means includes means for detecting the axial pipe take-off speed and means for controlling the axial movement of the sawing mechanism as a function of said axial pipe take-off speed.

12. Apparatus according to claim 11, wherein a metal basket with radially extending stays is attached in the end of the pipe, several of said stays converging at a central position with respect to said pipe to form a scanning point for a scanning unit of said sawing mechanism control means, said scanning unit forming said means for detecting the axial pipe take-off speed.

13. Apparatus according to claim 11, wherein said drum drive control means includes means for detecting the magnitude of the sag in said profiled strip occurring between said extending means and said drum, and means for controlling the speed of the drum drive means as a function of the magnitude of said sag.

14. Apparatus according to claim 11, wherein said profiled strip is formed of thermoplastic resinuous material and includes a tongue along one edge and a groove along an opposite edge, the tongue of one winding being engageable in the groove of the next successive winding, and wherein said joining means includes means for thermoplastically joining said windings along said tongue and groove.

15. A method of manufacturing wound pipes comprising:

extruding a continuous length of profiled strip, said profiled strip being constructed of thermoplastic synthetic resinous material and including a tongue along one edge and a groove along an opposite edge;

guiding said profiled strip onto a winding surface of a rotating drum with successive windings of said strip extending in a spiral manner in close proximity to one another, the tongue of one winding being engageable in the groove of the next successive winding;

joining said successive windings to one another to form a pipe from said profiled strip by heating said strip and pressing said respective groove and tongue to thermoplastically connect said successive windings together;

controlling the speed of rotation of the drum as a function of the extrusion speed of the profiled strip by detecting the magnitude of sag of the profiled strip adjacent the drum and by controlling the speed of the drum as a function of the magnitude of the sag;

cooling the joined windings of said profiled strip after the thermoplastic connection of said successive windings together; and sizing said pipe during said cooling with a cooled-sizing shoe which is radially adjustable with respect to the axis of rotation of said drum to control the dimensional accuracy of the pipe.

16. A method according to claim 15, further comprising removing said pipe from said drum at a take-off speed of the pipe proportional to the speed of rotation of said drum, and detecting the take-off speed of said pipe by scanning a scanning point formed at a central position at the end of said pipe.

17. A method according to claim 16, further comprising cutting said pipe with an axially movable sawing mechanism that moves at the same axial speed as said pipe along said drum, the speed of said axially movable sawing mechanism being controlled as a function of detecting said take-off speed.

* * * * *